US012143752B2

(12) United States Patent
Springer

(10) Patent No.: US 12,143,752 B2
(45) Date of Patent: Nov. 12, 2024

(54) INDICATION OF NON-VERBAL CUES WITHIN A VIDEO COMMUNICATION SESSION

(71) Applicant: Zoom Video Communications, Inc., San Jose, CA (US)

(72) Inventor: Shane Paul Springer, Oregon City, OR (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/320,029

(22) Filed: May 18, 2023

(65) Prior Publication Data

US 2023/0291868 A1 Sep. 14, 2023

Related U.S. Application Data

(63) Continuation of application No. 17/515,483, filed on Oct. 31, 2021, now abandoned.

(51) Int. Cl.
| | |
|---|---|
| *H04N 7/15* | (2006.01) |
| *G06F 3/14* | (2006.01) |
| *G06N 20/00* | (2019.01) |
| *G06V 20/40* | (2022.01) |
| *G06V 40/19* | (2022.01) |
| *G06V 40/20* | (2022.01) |
| *H04L 65/403* | (2022.01) |

(52) U.S. Cl.
CPC .............. *H04N 7/15* (2013.01); *G06F 3/14* (2013.01); *G06N 20/00* (2019.01); *G06V 20/41* (2022.01); *G06V 40/19* (2022.01); *G06V 40/20* (2022.01); *H04L 65/403* (2013.01)

(58) Field of Classification Search
CPC .......... H04N 7/15; H04N 7/152; H04N 7/147; H04L 65/403; H04L 65/4015; H04L 65/611; G06N 20/00; G06N 3/08; G06N 20/10; G06F 3/14; G06V 20/41; G06V 40/19; G06V 40/18; G06V 40/20; G06V 20/20; G06V 10/764
USPC .......................................... 348/14.01–14.16
See application file for complete search history.

(56) References Cited

U.S. PATENT DOCUMENTS

| | | | |
|---|---|---|---|
| 10,440,325 B1 * | 10/2019 | Boxwell | ................ H04N 5/445 |
| 11,228,625 B1 | 1/2022 | Libin | |
| 2014/0189016 A1 * | 7/2014 | Goldsmith | ............ H04L 67/535 |
| | | | 709/205 |

(Continued)

*Primary Examiner* — Yogeshkumar Patel
(74) *Attorney, Agent, or Firm* — Young Basile Hanlon & MacFarlane, P.C.

(57) ABSTRACT

Methods and systems provide for indication of non-verbal cues within a video communication session. In one embodiment, a method displays, for each of a number of participants within a video communication session, a user interface including participant windows corresponding to the plurality of participants, and a video for each of at least a subset of the participants, where the video is displayed within the corresponding participant window for the participant. The method analyzes, in real time, the video to detect a non-verbal cue from a participant. The method determines that the non-verbal cue has been sustained for a duration that exceeds a designated threshold of time. The method then displays, within the UI of at least one of the participants, a prompt associated with the non-verbal cue.

19 Claims, 9 Drawing Sheets

(56) References Cited

U.S. PATENT DOCUMENTS

| | | | |
|---|---|---|---|
| 2018/0241882 A1* | 8/2018 | Lee | H04N 7/147 |
| 2020/0314483 A1 | 10/2020 | Rakshit et al. | |
| 2021/0176429 A1* | 6/2021 | Peters | G06V 20/41 |
| 2021/0185276 A1* | 6/2021 | Peters | G06V 20/41 |
| 2021/0271864 A1* | 9/2021 | Litvin | G06V 10/764 |
| 2021/0399911 A1* | 12/2021 | Jorasch | H04L 12/1822 |

* cited by examiner

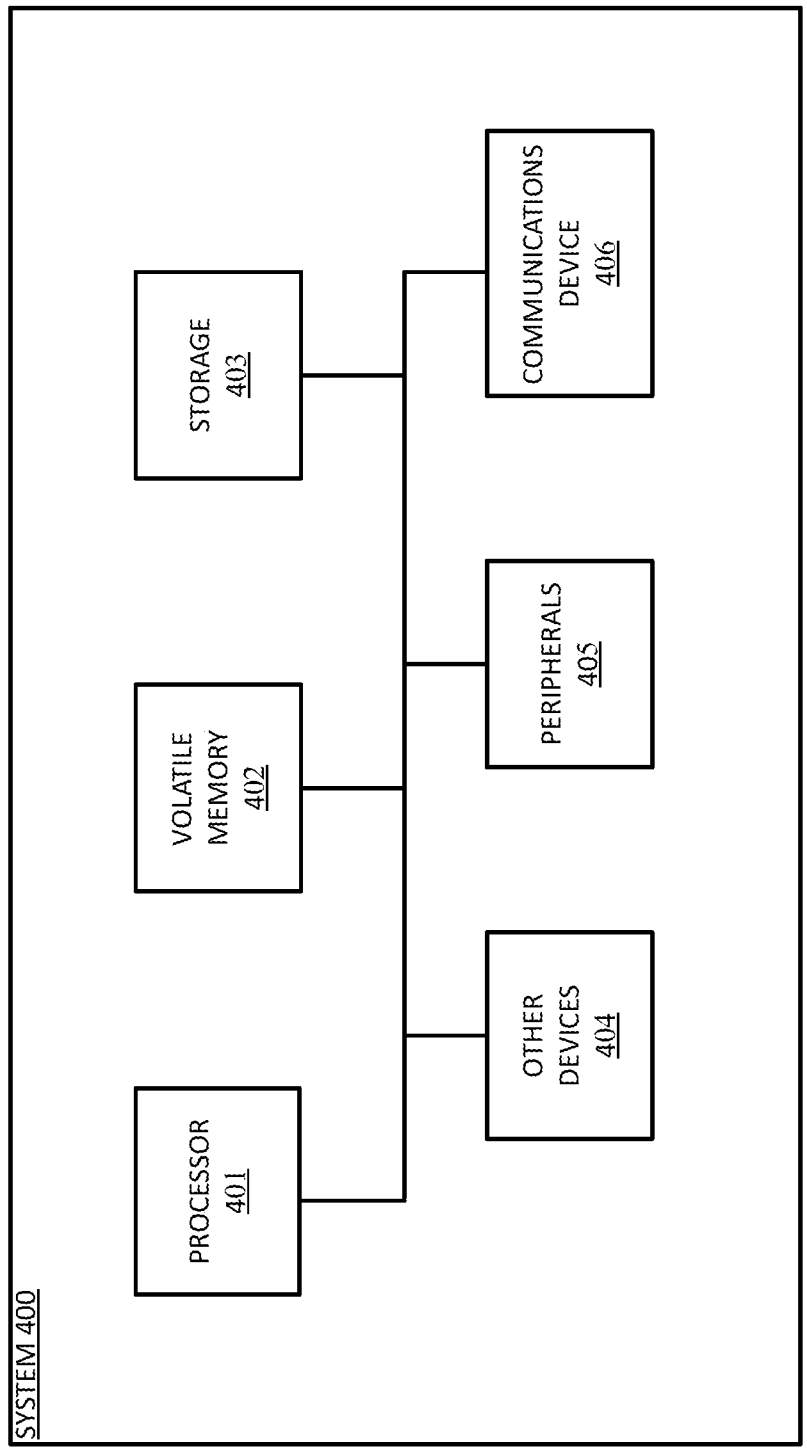

INDICATION OF NON-VERBAL CUES WITHIN A VIDEO COMMUNICATION SESSION

CROSS-REFERENCE TO RELATED APPLICATION(S)

This application is a continuation of U.S. patent application Ser. No. 17/515,483, filed Oct. 31, 2021, the entire disclosure of which is hereby incorporated by reference.

FIELD

The present application relates generally to digital communication, and more particularly, to systems and methods for providing indication of non-verbal cues within a video communication session.

SUMMARY

The appended claims may serve as a summary of this application.

BRIEF DESCRIPTION OF THE DRAWINGS

The present application relates generally to digital communication, and more particularly, to systems and methods providing for dynamic alteration of notification preferences within a video communication platform.

The present disclosure will become better understood from the detailed description and the drawings, wherein:

FIG. 4 is a diagram illustrating an exemplary computer that may perform processing in some embodiments.

DETAILED DESCRIPTION OF THE DRAWINGS

Figure 1A:
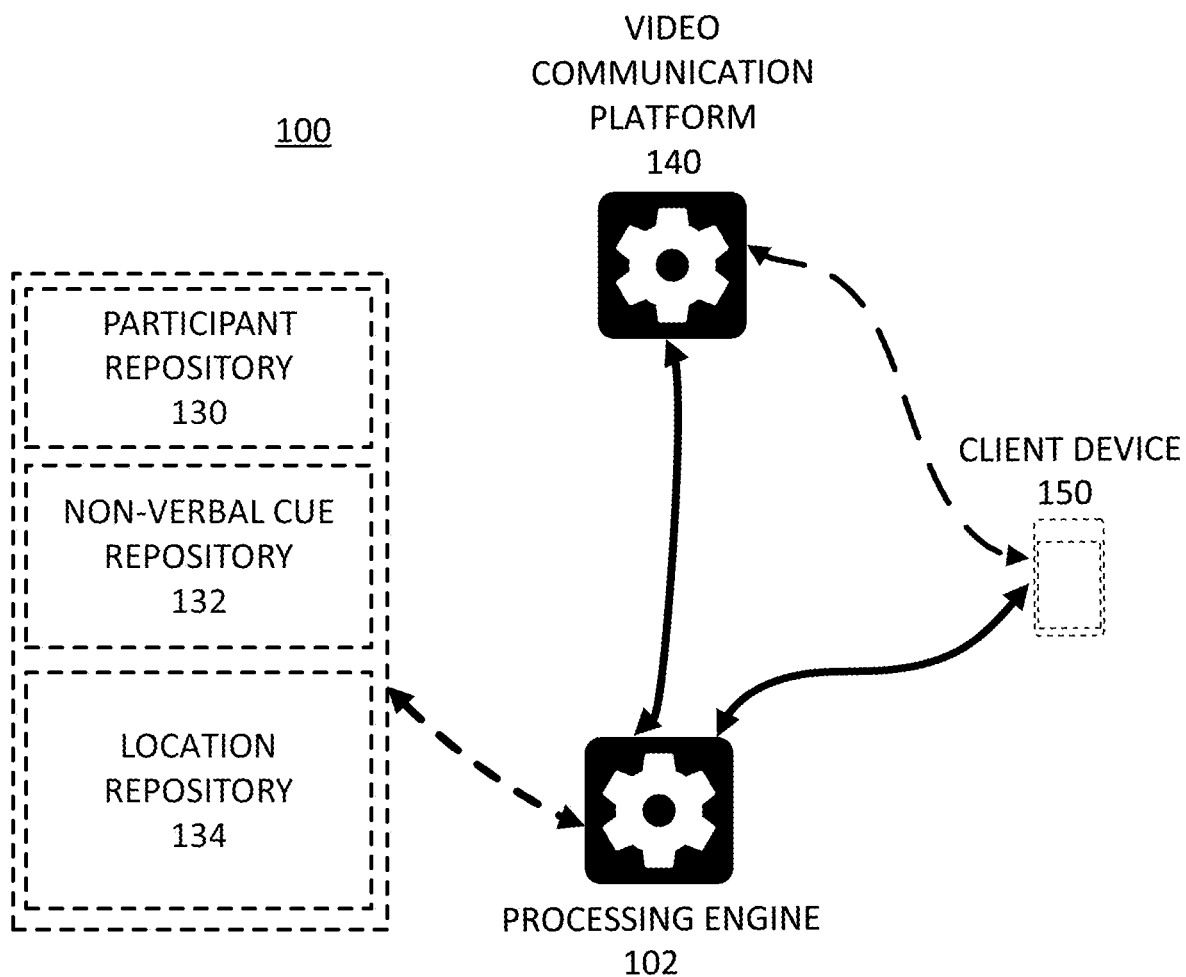
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Due to the explosive growth and global nature of remote video communication, today's global workplace presents more inclusion challenges than ever before. Participants of video communication sessions often span multiple cultures with differing cultural expectations regarding communication. As a result, it is common for meetings to have inequitable participation and engagement, issues left unresolved, or action items left unclear.

For example, a participant from one culture may not volunteer to speak or engage within the session on his or her own volition, because the cultural expectations of that participant may involve a hierarchical structure of communication such that the participant is expected to not interrupt someone higher in the organizational hierarchy until that superior specifically calls on the participant. The participant may additionally or alternatively be waiting for an appropriate pause in the conversation, but feels that there is not a sufficient pause to begin engaging. Instead of directly engaging verbally, the participant may instead provide some non-verbal cues that the participant wishes to engage. If the host participant or a currently speaking participant does not detect these non-verbal cues and act on them, however, then the participant may never engage. Such problems may be exacerbated by the nature of remote video communication, which typically relies on broadcasted video displayed in participant windows, rather than the more direct sensory awareness provided by in-person communication.

Thus, there is a need in the field of digital communication tools and platforms to create new and useful systems and methods for providing indication of non-verbal cues within a video communication session, based on detection of non-verbal cues from participants within the video communication session. As participants communicate within a video communication session, the system is configured to analyze each video to detect a non-verbal cue from a participant. If the system determines that the non-verbal cue has been sustained for a duration that exceeds a designated threshold of time, then the system can display a prompt to at least one of the participants. In various embodiments, this prompt can be a recommendation for the participants making the non-verbal cue to verbally engage, a recommendation for a speaking participant to prompt the participant making the non-verbal cue for input, or any other prompt relating to the non-verbal cue.

In one embodiment, a method displays, for each of a number of participants within a video communication session, a user interface (hereinafter "UI") including participant windows corresponding to the plurality of participants, and a video for each of at least a subset of the participants, where the video is displayed within the corresponding participant window for the participant. The method analyzes, in real time, the video to detect a non-verbal cue from a participant. The method determines that the non-verbal cue has been sustained for a duration that exceeds a designated threshold of time. The method then displays, within the UI of at least one of the participants, a prompt associated with the non-verbal cue.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a video communication platform 140. The processing engine 102 is connected to the video communication platform 140, and optionally connected to one or more repositories and/or databases, including, e.g., a participant repository 130, non-verbal cue repository 132, and/or a location repository 134. One or more of the databases may be combined or split into multiple databases. The user's client device 150 in this environment may be a computer, and the video communication platform 140 and processing engine 102 may be applications or software hosted on a computer or multiple computers which are communicatively coupled via remote server or locally.

The exemplary environment 100 is illustrated with only one client device, one processing engine, and one video communication platform, though in practice there may be more or fewer additional client devices, processing engines, and/or video communication platforms. In some embodiments, the client device(s), processing engine, and/or video communication platform may be part of the same computer or device.

Figure 2:
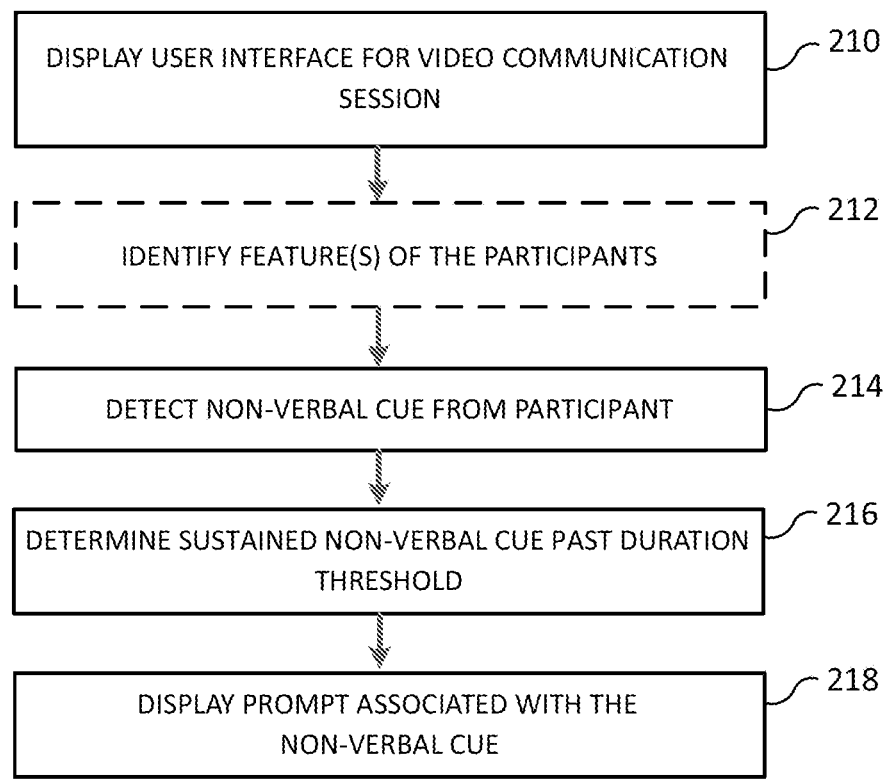
FIG. 2 is a flow chart illustrating an exemplary method that may be performed in some embodiments.

In an embodiment, the processing engine 102 may perform the exemplary method of FIG. 2 or other method herein and, as a result, provide indication of non-verbal cues within a video communication platform. In some embodiments, this may be accomplished via communication with the client device, processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or video communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the client device 150. In some embodiments, one or more of the video communication platform 140, processing engine 102, and client device 150 may be the same device. In some embodiments, the user's client device 150 is associated with a first user account within a video communication platform, and one or more additional client device(s) may be associated with additional user account(s) within the video communication platform.

In some embodiments, optional repositories can include one or more of a participant repository 130, non-verbal cue repository 132, and/or location repository 134. The optional repositories function to store and/or maintain, respectively, information about participants of a video communication session; non-verbal cues to be detected within the video communication session; and location information related to participants along with, in some embodiments, non-verbal cues and/or cultural expectations of non-verbal cues which may be associated with those locations. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate meetings, presentations (e.g., video presentations) and/or any other communication between two or more parties, such as within, e.g., a video conference or virtual classroom. A video communication session within the video communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
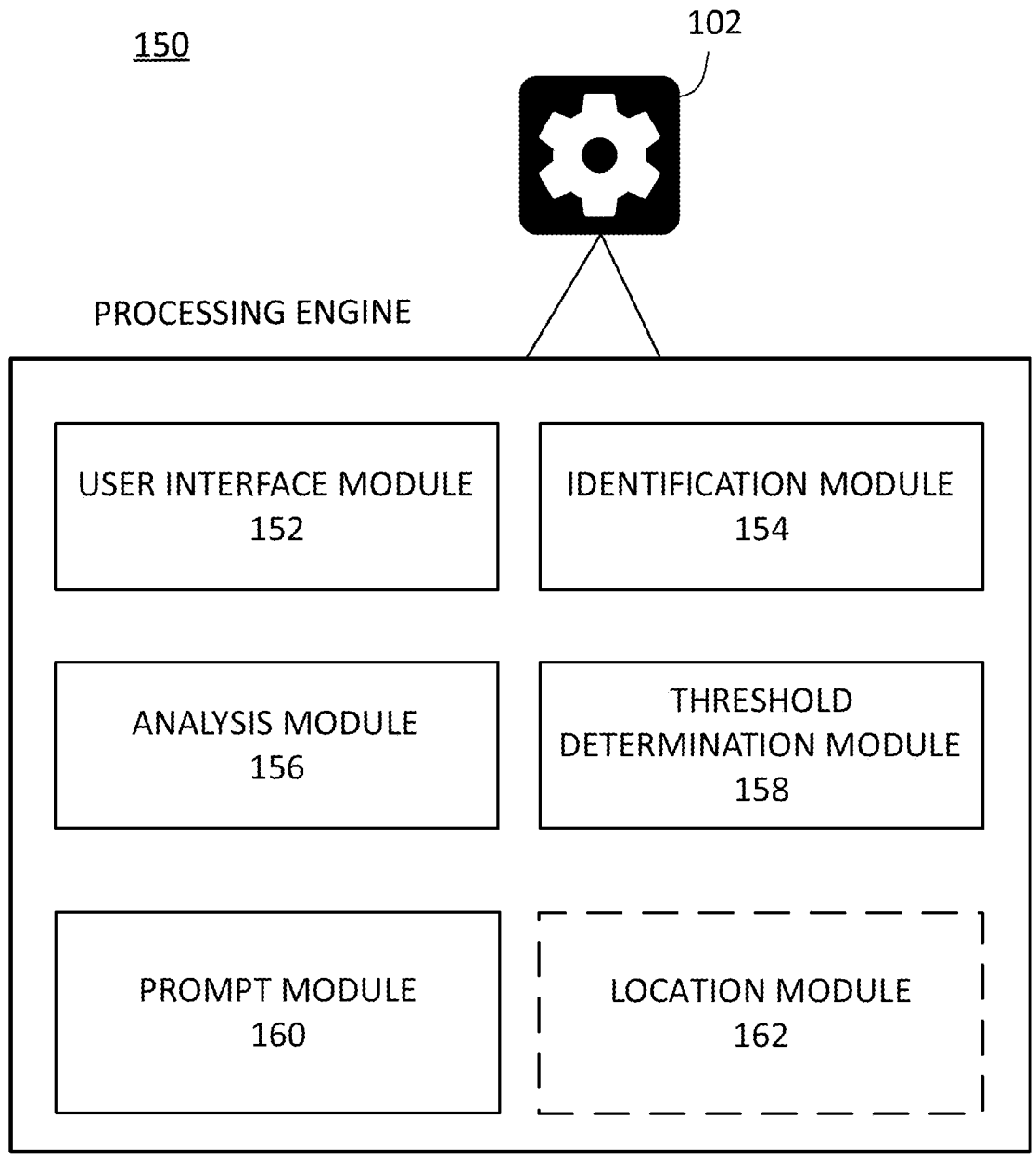
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to display, for each of a number of participants within a video communication session, a UI consisting of participant windows with a video for each of at least a subset of the participants.

Optional identification module 154 functions to identify a section of each video corresponding to the participant and/or one or more physical features of the participant, such as, e.g., eyes.

Analysis module 156 functions to analyze, in real time, each video to detect a non-verbal cue from the participant on a subject.

Threshold determination module 158 functions to determine that the non-verbal cue has been sustained for a duration that exceeds a designated threshold of time.

Prompt module 160 functions to display, within the UI of at least one of the participants, a prompt associated with the non-verbal cue.

Optional location module 162 functions to identify a geographical location for at least one of the participants, determine one or more non-verbal cues and/or cultural expectations of non-verbal cues based on the geographical location of the participant(s), and customize the prompt based on the determination(s).

The above modules and their functions will be described in further detail in relation to an exemplary method below.

FIG. 2 is a flow chart illustrating an exemplary method that may be performed in some embodiments.

At step 210, the system displays a UI for a video communication session. The UI is displayed for each of a number of participants within the video communication session. The UI includes at least a number of participant windows corresponding to the number of participants, and a video for each of at least a subset of the participants. The video for a participant is displayed within the corresponding participant window for that participant.

In some embodiments, the system connects participants to a live communication stream via their respective client devices. The communication stream may be any "session" (such as an instance of a video conference, webinar, informal chat session, or any other suitable session) initiated and hosted via the video communication platform, for remotely communicating with one or more users of the video communication platform, i.e., participants within the video communication session. Participants are connected on user devices, and are associated with user accounts within the communication platform.

The UI for the video communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the video communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a video communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

At least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

In some embodiments, at optional step 212, the system identifies one or more features of participants, such as, e.g., the eyes of participants. In some embodiments, the system identifies a section of each video corresponding to one or more specific physical features of a participant. In some embodiments, the physical feature(s) of the participant are detected via one or more video processing and/or analysis techniques. In some embodiments, the detection of the participant's features may be performed by one or more Artificial Intelligence (AI) engines. Such AI engine(s) may be configured to perform aspects or techniques associated with, e.g., machine learning, neural networks, deep learning, computer vision, or any other suitable AI aspects or techniques. In some embodiments, such AI engine(s) may be trained on a multitude of differing images of previous participant imagery and/or features appearing within video content, as well as images where participant imagery and/or features do not appear within video content. In some embodiments, participant imagery and/or physical features may be labeled within at least some of the training data. In some embodiments, the AI engine(s) are trained to classify, within a certain range of confidence, whether a user appears or does not appear within a given piece of video content.

In some embodiments, the system detects a face region or eye region within the video content. In some embodiments, as in previous steps, the system may detect the face region or eye region using one or more aspects or techniques of AI engine(s). For example, in some embodiments a deep learning model may be used for face and/or eye detection. Such a deep learning model may be trained based on, e.g., a multitude of images of users' faces and/or eyes within cropped and/or uncropped images from video content. In some embodiments, one or more facial or eye recognition algorithms are used. In some embodiments, feature-based methods may be employed. In some embodiments, statistical tools for geometry-based or template-based face or eye recognition may be used, such as, e.g., Support Vector Machines (SVM), Principal Component Analysis (PCA), Linear Discriminant Analysis (LDA), Kernel methods or Trace Transforms. Such methods may analyze local facial features and their geometric relationships. In some embodiments, techniques or aspects may be piecemeal, appearance-based, model-based, template matching-based, or any other suitable techniques or aspects for detecting a face and/or eye region.

At step 214, the system detects a non-verbal cue from a participant. In particular, the system analyzes, in real time, each video to detect a non-verbal cue from a participant on a subject.

A non-verbal cue may include any movement, gesture, or behavior of a participant reflected within the video of that participant in a video session. Non-verbal cues may include, e.g., postures (e.g., standing up straight, leaning forward, repositioning in one's chair, stretching, shoulder height), facial expressions (e.g., a smile, a smirk, a confused expression, or a shocked expression), aspects of eye gaze (e.g., sustained eye contact, eye rolling, widened eyes), gestures (e.g., raising a hand, pointing at a subject, or shrugging shoulders), and paralinguistic features (e.g., tone of voice or affect, loudness), body language, and proxemics or use of personal space.

In some embodiments, as in previous steps, the system may detect the non-verbal cue using one or more aspects or techniques of AI engine(s). For example, in some embodiments a deep learning model may be used for detection and classification of participant movements, facial expressions, or any other suitable indication of a non-verbal cue. Such a deep learning model may be trained based on, e.g., a multitude of still frames and/or video of users' physical movements, gestures, facial expressions, and/or other suitable data from video content. The training data may include still frames and/or video from a number of prior video communication sessions, either with one or more of the participants from this video session or with none of the participants from this video session.

In some embodiments, the system is configured to detect and classify the non-verbal cue from a list of pre-designated non-verbal cues. Such a list of non-verbal cues may be the same for any participant. In some embodiments, the system identifies a geographical location of a participant broadcasting video, then detects and classifies the non-verbal cue from a list of pre-designated non-verbal cues for that specific geographical location. In this way, the non-verbal cues which may be considered to be detected for a given participant can be informed by the, e.g., country, region, or other geographical location the participant resides in. In some embodiments, this geographical data about the participant can be determined based on, e.g., IP address of the participant, data from the client device the participant is using (such as, for example, GPS data), data from a user profile or user settings or preferences within the video communication platform, or any other form of obtaining a geographical location of the participant. In some embodiments, rather than identifying a current geographical location, the system can identify a country or region of origin. In some embodiments this may be self-identified by the participant, retrieved from existing participant information from the video communication platform, may be determined as a prediction from the system, or any other suitable method. In some embodiments, a combination of current geographical location and country or region of origin may be used to classify a non-verbal cue from a list of non-verbal cues that represents a superset of the sets of non-verbal cues from the current geographical location and the country or region of origin.

In some embodiments where a pre-defined list of non-verbal cues are used in the detection of the non-verbal cue from the participant, each of the non-verbal cues includes a pre-defined signature for detection of the non-verbal cue. In some embodiments, the system first builds an AI model for the detection of such signatures from the list of non-verbal cues, trains the model using training data which includes video content with various non-verbal cues, and then uses the model to detect the non-verbal cue from the participant. In some embodiments, this AI model is combined with a behavioral model which uses a behavioral profile of the participant to determine which non-verbal cues and signatures to look for. In some cases, the system builds this behavioral model for the participant using AI-learned non-verbal cues and signatures from the participant. In some embodiments, this behavioral model may learn non-verbal cues and signatures which the system was previously unaware of, or which may be unique to the participant. In some embodiments, the system may additionally or alternatively use non-auditory feedback systems to build an engagement model for detecting engagement or lack thereof within the participant, and for increasing engagement in the participant using one or more additional models such as, e.g., a behavioral model or non-verbal cue detection model.

In some embodiments, non-verbal cues may include expressions of disinterest or unwillingness to participate. Such non-verbal cues may be, for example, slouching in one's seat, leaning backwards, lack of eye contact for a fixed period of time, or other similar cues which may signal lack of interest in participating in some cultures. In some embodiments, such cues are the inverse of cues suggesting that the participant wishes to participant, and may be used for prompts and/or for recommending actions based on that disinterest.

In some embodiments, the non-verbal cue is eye contact. The system identifies a section of each video corresponding to the eyes of the participant, then analyzes, in real time, each video to detect any sustained eye contact from a participant on a subject. The eye contact may be sustained for a duration that exceeds a designated threshold of time, as will be described with respect to step 216. In various embodiments, the subject may be any subject on camera (i.e., in the room the participant is in), any subject corresponding to the screen of the client device the participant is using, the camera itself, or any other suitable subject. In some embodiments, the system identifies a geographical location of the participant making the sustained eye contact, and the detection of the eye contact is based on non-verbal cues associated with that geographical location.

In some embodiments, the system receiving a behavioral profile for the participant associated with the non-verbal cue. In varying embodiments, the behavioral profile may be an existing profile related to a particular participant and/or their user account within the video communication platform. The behavioral profile may include a number of behaviors associated with that participant with respect to the video communication platform, such as, e.g., preferences for video sessions, previous selections of options within the video communication platform, routines or habits detected by the video communication platform with respect to video sessions or use of the client device, detected metrics of user engagement for past and/or current video sessions, or any other suitable behaviors within the video communication platform. In some embodiments, the system determines one or more non-verbal cues associated with the behavioral profile for the participant. In some embodiments, this may include determining a set of non-verbal cues from the listed behaviors from the behavioral profile. In some embodiments, the prompt associated with the non-verbal cue is customized based on the determined non-verbal cues and behavioral profile. For example, the prompt can include aspects of the user's behavioral with respect to non-verbal cues in order to personalize the prompt to that user and their learned non-verbal behaviors.

In some embodiments, the system receives behavioral profiles for one or more of a host participant, and a currently speaking participant. The system determines one or more expectations of non-verbal cues associated with the behavioral profiles for the participants. The prompt associated with the non-verbal cue is then customized based on the determined expectations of non-verbal cues and the behavioral profiles. For example, the prompt can include aspects of the participant's behavior and expectations around non-verbal cues to personalize the prompt to that user.

At step 216, the system determines that the non-verbal cue has been sustained for a duration that exceeds a designated threshold of time.

In some embodiments, the designated threshold of time corresponds to the specific non-verbal cue that has been detected. For example, if the non-verbal cue that has been detected in step 214 is eye contact (e.g., eye contact with the camera, with another person in the room, or with the area of their screen or UI that corresponds to a given participant), then a designated threshold of time may be retrieved for sustaining eye contact with that subject. If the amount of time the participant maintains eye contact with that subject exceeds this designated threshold, then the system determines that the threshold has been satisfied. In some embodiments, the designated threshold for a given non-verbal cue may be modified depending on the specific geographical location and/or country or region of origin associated with the participant. For example, participants from some countries may sustain eye contact for a longer period than others to indicate that the participant wishes to interject in a discussion, depending on varying cultural expectations around cultural cues.

At step 218, the system displays, within the UI of at least one of the participants, a prompt associated with the non-verbal cue. In varying embodiments, the prompts may be a notification (e.g., a push notification or pop-up notification), recommendation, message (e.g., a chat message or an SMS message), or any other suitable prompt. For example, the prompt may be displayed within, e.g., a chat section of the video communication UI, a pop-up toast notification, or within a separate mobile phone application.

In some embodiments, the participant associated with the non-verbal cue is prompted, i.e., the prompt associated with the non-verbal cue is displayed to the participant in the video associated with the non-verbal cue. In some embodiments, the prompt to the participants consists of a recommendation to verbally engage with one or more participants within the video communication session. For example, the prompt may read, "You appear to have something to say. Raise your hand so the speaker knows!", or "It looks like you want to speak up. You may do so now." In some embodiments, the prompt may appear in a specific time interval where a pause in the conversation has occurred, or when a pause is anticipated by the system to occur soon based on the patterns of speech of currently speaking participant(s).

In some embodiments, the prompt to the participant may be a recommendation to engage with one or more UI components indicating an intent to verbally engage. For example, there may be a UI component marked "raise your hand" which, when engaged by the participant at the client device, signals that the participant is virtually raising their hand as if to signal that they have something to say, and would like to be called upon by the host participant of the session or a currently speaking participant. The prompt may recommend to the participant that he or she should use the included "raise your hand" feature in one click in order to signal non-verbal indication of a desire to participate in the discussion. The host or speaking participant, in turn, may see the indication that the participant has virtually raised their hand, and may cede the floor to the participant for their input. Many other such UI components and prompts may be contemplated.

In some embodiments, the system identifies a geographical location and/or country or region of origin for the participant associated with the non-verbal cue. The detection of the non-verbal cue in step 214 includes identifying a non-verbal cue from a list of non-verbal cues associated with that geographical location, country or region of origin, or both. In some embodiments, the prompt associated with the non-verbal cue can then be customized for that participant based on the determined non-verbal cues.

In varying embodiments, the prompt associated with the non-verbal cue is displayed to a host participant of the video communication session, a currently speaking participant of the video communication session, or both. For example, the host may be prompted by a message indicating that the participant in question is likely to have additional insights. For example, the prompt may read, "Naoto appears to be highly engaged. Prompt them for input!" The host may see the prompt and then invite the participant for their input in the discussion. In some embodiments, the prompt includes a notification that the participant associated with the non-verbal cue intends to verbally engage, rather than, e.g., a recommendation to prompt the participant for input. In some embodiments, the prompt may include a reminder of cultural differences between participants, and may, in some cases, include specific information about geographical differences and/or the cultural expectations for communications associated with them.

In some embodiments, for each participant for which the prompt is displayed, the system identifies a geographical location and/or country or region of origin associated with that participant, then determines one or more cultural expectations of non-verbal cues based on the geographical location. The prompt displayed for the participant is then customized based on the one or more determined cultural expectations for that geographical location and/or country or region of origin associated with that participant. In some embodiments, the cultural expectations of non-verbal cues may be pre-designated based on that specific geographical location, country or region of origin, or some combination thereof. Cultural expectations of non-verbal cues may include one or more pieces of information about non-verbal cues, including, e.g., a list of non-verbal cues (e.g., a head shake, eye contact, rubbing one's neck, raised eyebrows, or any other suitable non-verbal cues), expectation duration for that non-verbal cue to be exhibited in order for the cue to indicate something (e.g., 5 seconds or longer), what the non-verbal cue indicates (e.g., sustained eye contact may indicate that the subject wishes to add something to the discussion or ask a question), and any other information which may be suitable. In varying embodiments, cultural expectations may additionally or alternative include or be modified by, e.g., established social norms, organizational norms, relational norms, situational factors and context, personality characteristics, and level of familiarity with other participants.

In some embodiments, the system may detect or receive indication of a termination of the video communication session. Once the video communication session has terminated, the system may be configured to display one or more metrics to at least one participant. For example, the system may send a report including various metrics to a host participant or speaking participant of the video communication session. The system may additionally or alternatively display a dashboard including various metrics, send an email, provide a notification or chat message, or otherwise send or display the information. In some embodiments, a visual indication of one or more metrics may be presented, such as, e.g., a histogram based on content.

Such metrics presented by the system may include, in various embodiments, at least one of: determined participant engagement, detected non-verbal cues, identified geographical locations of participants, and determined cultural expectations of participants regarding non-verbal cues during the video communication session. For example, a report may show that listening participants were highly engaged during a specific window of time during which a speaker was presenting. In some embodiments, highlights of the video communication session when participants were highly engaged may be recorded and made accessible for playback by one or more participants. Engagement metrics may be determined by the system after the video communication has terminated, based on detection of non-verbal cues from participants. In some embodiments, the system may provide information on how often participants are in video communication sessions that have a similar set of cultural expectations around communication and non-verbal cues, or how often or when participants are in meetings that resonate with their communication style compared to how often or when they are in meetings that do not resonate with their communication style. In some embodiments, the system may provide recommendations, such as recommended actions or modifications to communication style, which may result in more engagement with participants with certain cultural expectations or communication styles. In some embodiments, the system may present a participant with information on other specific participants and observations the system has detected about them during the video communication session. For example, the system may provide a notification to a speaking participant that a particular user had something to say for 15 minutes but did not interject into the discussion. Such information may lead speakers to modify their behavior to more proactively include or make conversational space for particular participants during discussion. Many other such metrics, notifications, and/or recommendations may be contemplated.

Figure 3A:
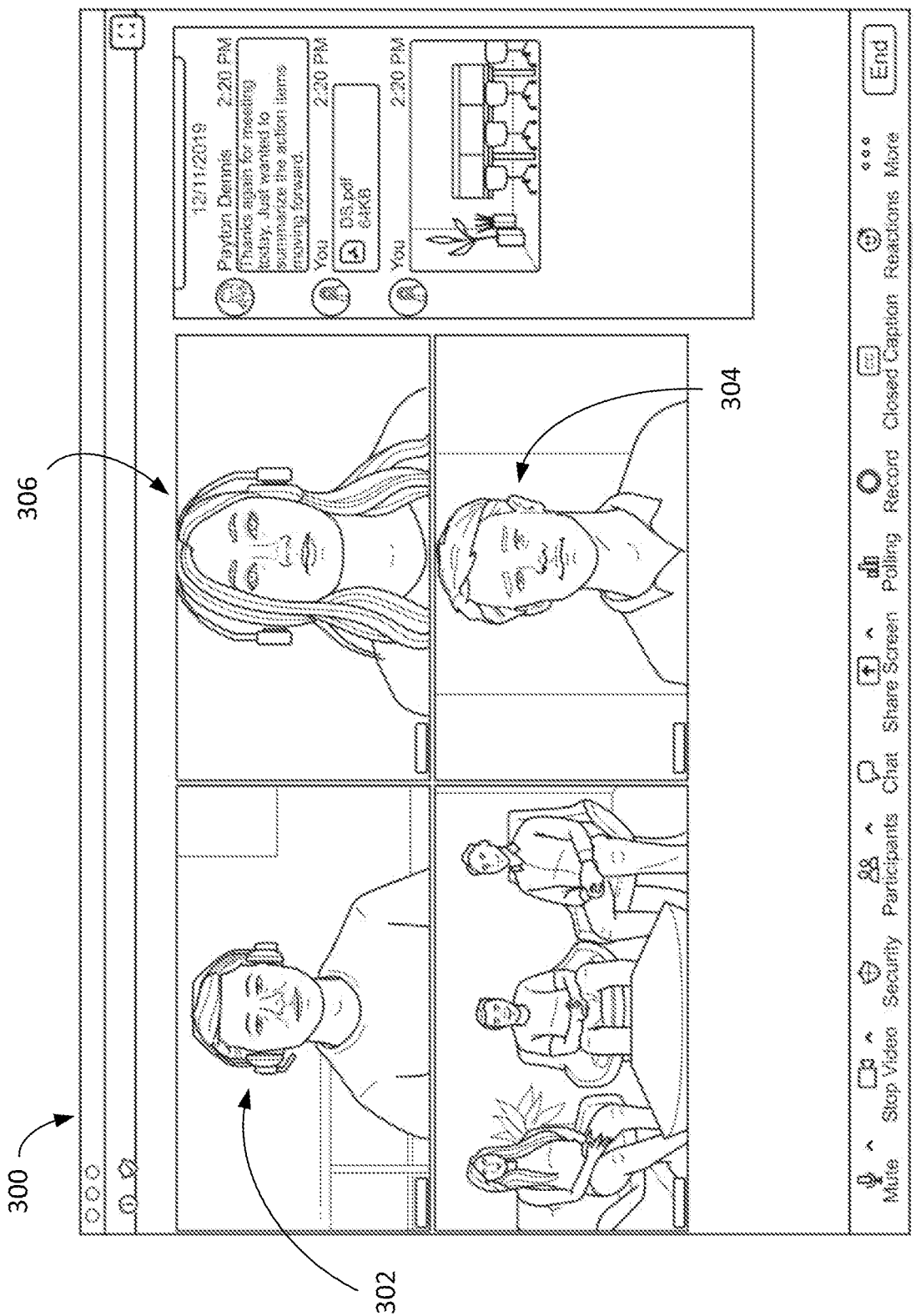
FIG. 3A is a diagram illustrating one example embodiment of a UI for a video communication session with multiple participants, according to some embodiments.

FIG. 3A is a diagram illustrating one example embodiment of a UI for a video communication session with multiple participants, according to some embodiments.

User interface 300 depicts a UI that a particular participant is viewing on a screen of the participant's client device. Four participant windows are displayed within the UI, arranged in a 4×4 grid. Within each participant window is a video. The video in each of the participant windows is a live video feed captured via a camera or other device that is either built into or connected to the client device of that participant, then streamed to the UIs of participants. Also appearing in the bottom left corner of each participant window is a name of the participant, as well as an icon indicating that the participant has their audio muted, if applicable. In the top right, a selectable UI element allows a participant to toggle between a full screen view and non-full-screen view. To the right, a chat or messaging section of the UI provides participants to enter messages to be displayed while the video communication session proceeds.

A bar at the bottom of the UI presents a number of selectable UI elements within the UI. These elements include Mute, Stop Video, Security, Participants, Chat, Share Screen, Polling, Record, Closed Caption, Reactions, More, and End.

Within this example embodiment, participant 302 is currently in the process of speaking on a subject of discussion. Participant 304 is the host of the video communication session, and is currently silently listening to the speaking participant 302. Participant 306 is currently silently listening to the speaking participant 302, and is also currently maintaining sustained eye contact with the camera.

Figure 3B:
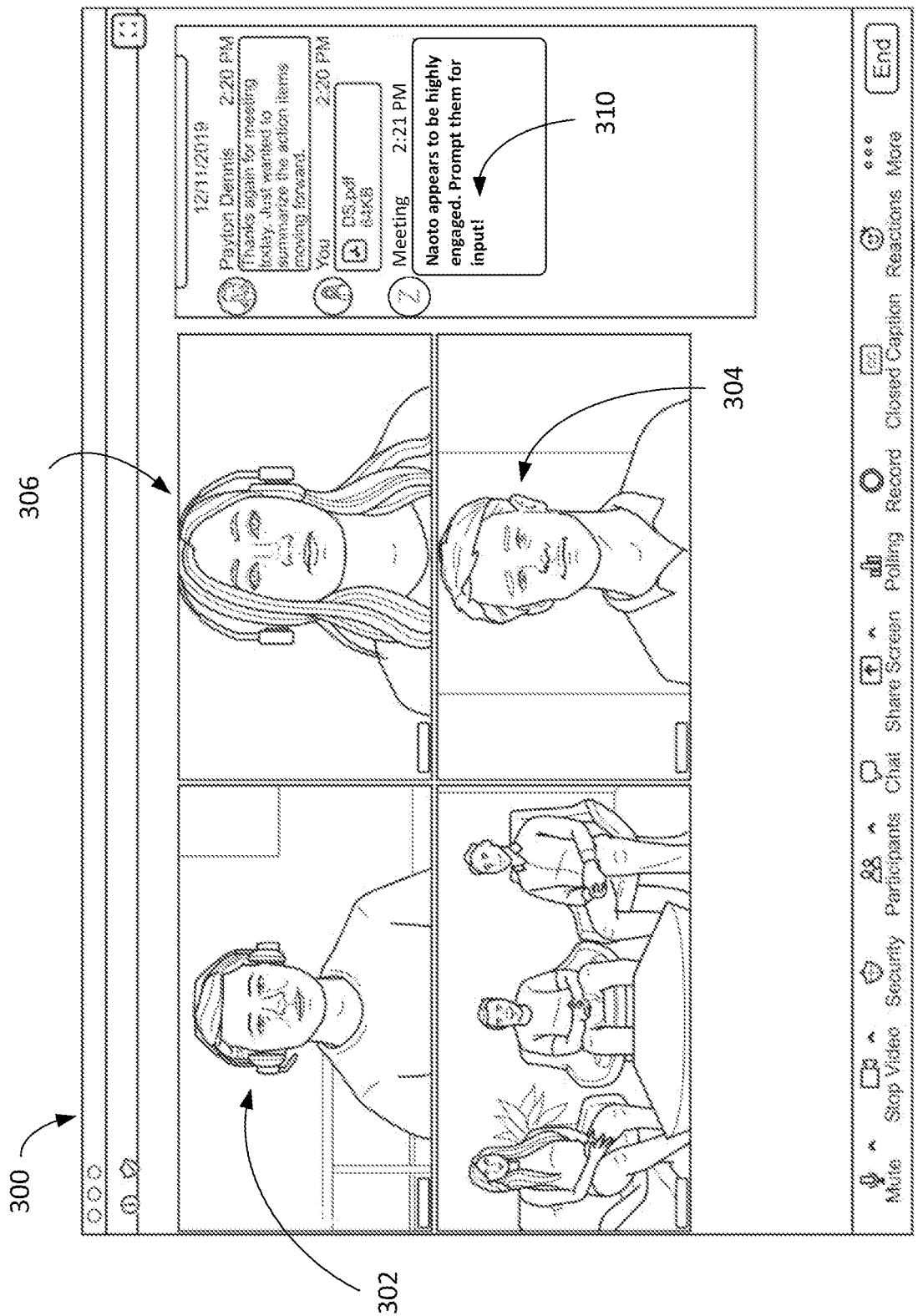
FIG. 3B is a diagram illustrating one example embodiment of displaying a prompt about a non-verbal cue to a host or speaking participant, according to some embodiments.

FIG. 3B is a diagram illustrating one example embodiment of displaying a prompt about a non-verbal cue to a host or speaking participant, according to some embodiments.

In the example of FIG. 3B, the UI and participants from FIG. 3A are present. The UI in questions belongs to speaking participant 302, who is viewing the UI on the client device's screen while speaking. While speaking, a prompt 310 appears in the chat section of the UI, reading, "Naoto appears to be highly engaged. Prompt them for input!" Naoto is participant 306, who is silently listening while maintaining sustained eye contact with the camera. Naoto is signaling with a non-verbal cue that she would like to interject with a question or comment. The system has analyzed the video to detect possible non-verbal cues from the participants. For Naoto, the system classifies potential non-verbal cues from among a list of non-verbal cues associated with Naoto's geographical location, which is different from speaking participant 302's location and host participant 304's location. The system classifies Naoto as having a non-verbal cue of sustained eye contact on a subject. The system further determines that the sustained eye contact has been maintained past a designated duration threshold of 5 seconds, which has been designated within the platform to be the threshold of eye contact in Naoto's geographical location to indicate that a listener likely wishes to interject. Thus, the system takes the next step of displaying a prompt to the speaking participant 302 recommending that the speaking participant prompt the participant 306 for input on the subject.

Figure 3C:
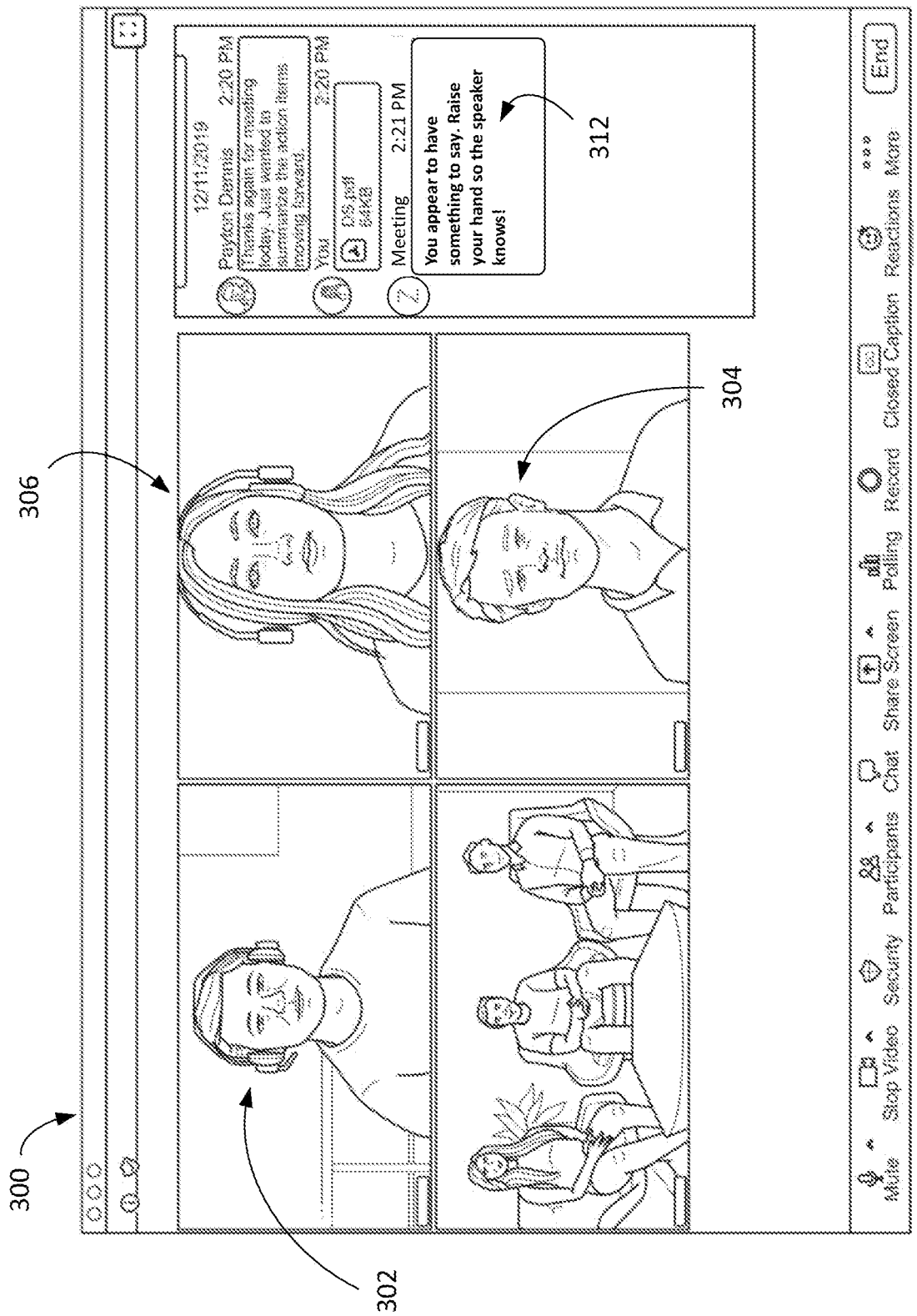
FIG. 3C is a diagram illustrating one example embodiment of displaying a prompt about a non-verbal cue to a participant associated with the non-verbal cue, according to some embodiments.

FIG. 3C is a diagram illustrating one example embodiment of displaying a prompt about a non-verbal cue to a participant associated with the non-verbal cue, according to some embodiments.

The example in FIG. 3C is similar to the example in FIG. 3B, except that the UI now belongs to the participant 306 who is exhibiting a non-verbal cue by maintaining fixed eye contact. On the UI of this participant who is exhibiting the non-verbal cue, the system has detected the non-verbal cue as discussed with respect to FIG. 3C. The system displays a prompt to the participant within the chat section of the UI, reading, "You appear to have something to say. Raise your hand so the speaker knows!" Upon reading the prompt, the participant may physically raise their hand, indicating to the speaking participant 302 and/or host participant 304 that the participant wishes to interject and engage in discussion. In some embodiments, the system may additionally determine that the geographical location of the speaking participant 302 and/or host participant 304 has a cultural expectation that raising one's hand indicates that one wishes to interject to add a comment or ask a question, and customizes the prompt accordingly to recommend to the participant that they should raise their hand.

Figure 3D:
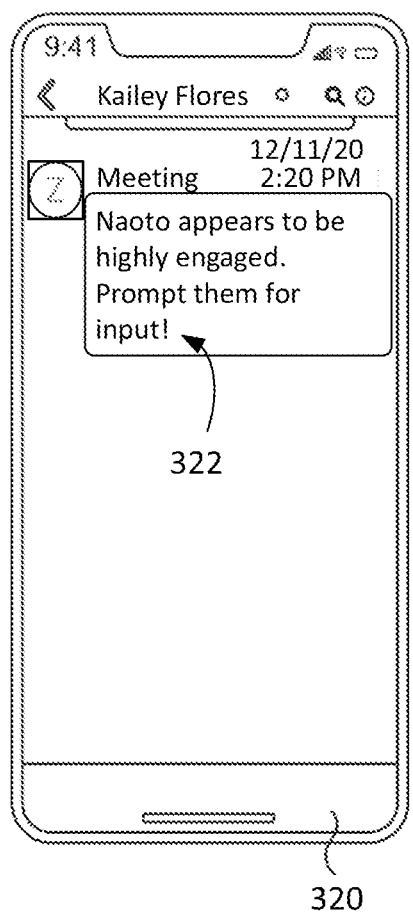
FIG. 3D is a diagram illustrating one example embodiment of displaying a prompt about a non-verbal cue on a mobile device, according to some embodiments.

FIG. 3D is a diagram illustrating one example embodiment of displaying a prompt about a non-verbal cue on a mobile device, according to some embodiments. Within the example embodiment of FIG. 3D, the scenario of FIG. 3B has occurred, but instead of the prompt being displayed at the chat section of the video communication UI, the speaking participant receives a prompt 322 as a notification displayed on a mobile device 320, e.g., a smartphone belonging to the user. In some embodiments, the notification may appear, for example, on a lock screen of the mobile device, and may additionally or alternatively appear within an application for the video communication platform. In some embodiments, the participant may receive a vibration, notification sound, or other alert or signal indicating that a notification has occurred.

Figure 3E:
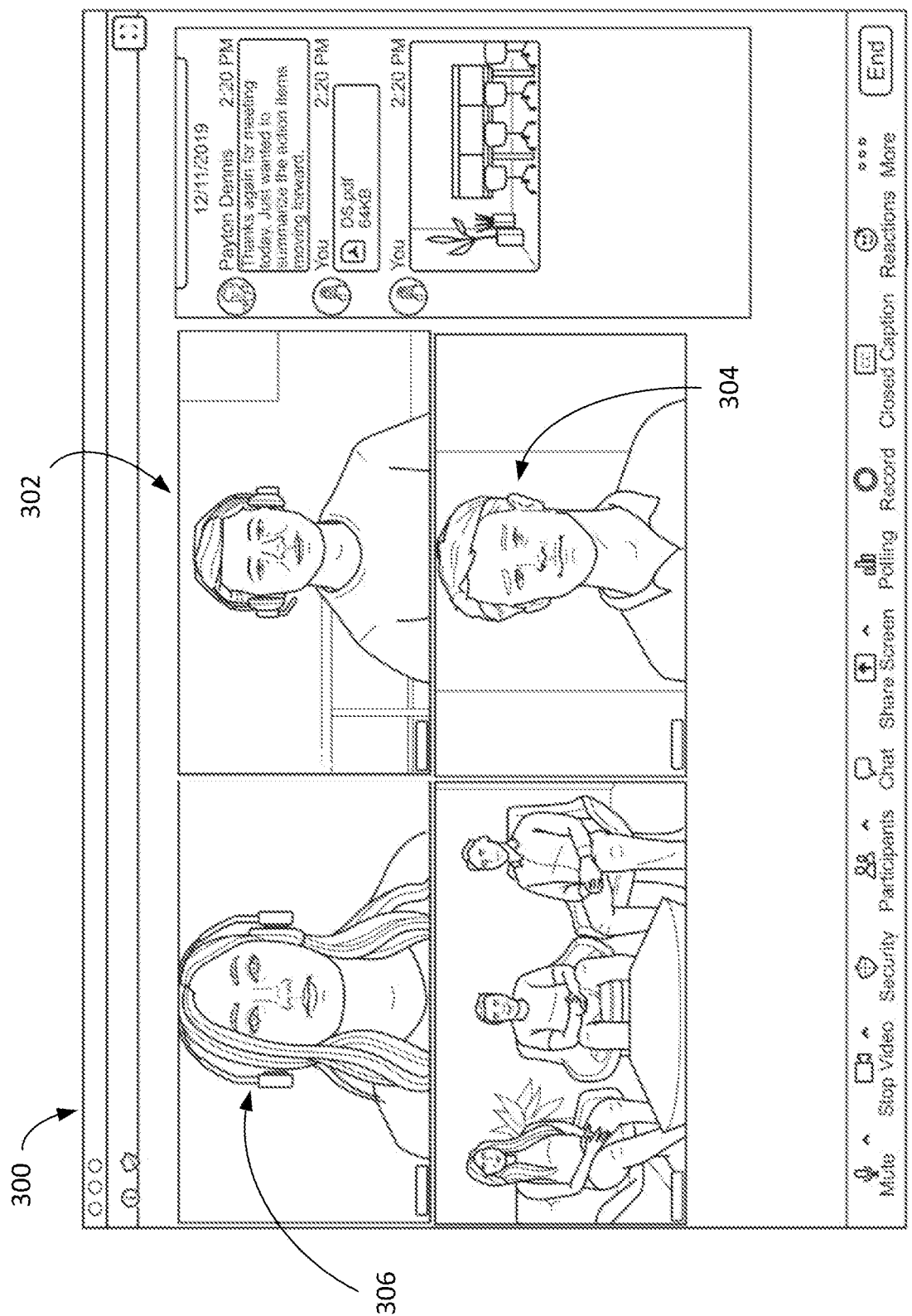
FIG. 3E is a diagram illustrating one example embodiment of modifying the arrangement of participant windows based on a detected non-verbal cue, according to some embodiments.

FIG. 3E is a diagram illustrating one example embodiment of modifying the arrangement of participant windows based on the detected non-verbal cue, according to some embodiments. Within the example embodiment, the system has detected a non-verbal cue from participant 306. The system then responds by altering the arrangement of the grid of participant windows to reflect participant 306's increased engagement and indicated desire to participate. Rather than the participant 306's window appearing in the top right portion of the grid, her window appears in the top left portion of the grid, a higher placement reflecting the increased engagement. In this respect, the grid may be adjusted in real time according to detected non-verbal cues from participants.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1

A method comprising: displaying, for each of a number of participants within a video communication session, a UI comprising: a number of participant windows corresponding to the number of participants, and a video for each of at least a subset of the participants, wherein the video is displayed within the corresponding participant window for the participant; analyzing, in real time, each video to detect a non-verbal cue from a participant; determining that the non-verbal cue has been sustained for a duration that exceeds a designated threshold of time; and displaying, within the UI of at least one of the participants, a prompt associated with the non-verbal cue.

Example 2

The method of Example 1, wherein analyzing each video to detect the non-verbal cue from the participant comprises: identifying a section of each video corresponding to the eyes of the participant; and analyzing, in real time, each video to detect sustained eye contact from a participant on a subject.

Example 3

The method of any of Examples 1-2, wherein the prompt associated with the non-verbal cue is displayed to the participant in the video associated with the non-verbal cue.

Example 4

The method of any of Examples 1-3, wherein the prompt displayed to the participant comprises one or more of: a recommendation to verbally engage with one or more participants within the video communication session, and a recommendation to engage with one or more UI components indicating an intent to verbally engage.

Example 5

The method of any of Examples 1-4, wherein the prompt associated with the non-verbal cue is displayed to one or more of: a host participant of the video communication session, and a currently speaking participant of the video communication session.

Example 6

The method of any of Examples 1-5, further comprising: for each participant for which the prompt is displayed: identifying a geographical location associated with that participant, and determining one or more cultural expectations of non-verbal cues based on the geographical location for the participant, the prompt displayed for the participant is customized based on the one or more determined cultural expectations.

Example 7

The method of any of Examples 1-6, wherein the prompt displayed to the at least one participant comprises a notification that the participant in the video associated with the non-verbal cue intends to verbally engage.

Example 8

The method of any of Examples 1-7, wherein the prompt displayed to the at least one participant comprises a recommendation for the at least one participant to prompt the participant associated with the non-verbal cue for verbal input within the video communication session.

Example 9

The method of any of Examples 1-8, further comprising: identifying a geographical location of the participant associated with the non-verbal cue, the detecting of the non-verbal cue comprises identifying a non-verbal cue from a list of non-verbal cues associated with the geographical location.

Example 10

The method of any of Examples 1-9, wherein the designated threshold of time is modified based on the geographical location of the participant associated with the non-verbal cue.

Example 11

The method of any of Examples 1-10, wherein one or more aspects of detecting non-verbal cue on a subject within the video for one of the participants is performed by an AI algorithm.

Example 12

The method of Example 11, wherein the AI algorithm is trained on a plurality of prior video communication sessions.

Example 13

The method of any of Examples 1-12, further comprising: modifying a preexisting arrangement of the participant windows within the UI to place the participant associated with the non-verbal cue in a more prominent or higher position.

Example 14

The method of any of Examples 1-13, further comprising: receiving a behavioral profile for the participant associated with the non-verbal cue; and determining one or more non-verbal cues associated with the behavioral profile for the participant, the prompt associated with the non-verbal cue is customized based on the determined non-verbal cues and behavioral profile.

Example 15

The method of any of Examples 1-14, further comprising: receiving behavioral profiles for one or more of: a host participant, and a currently speaking participant; determining one or more expectations of non-verbal cues associated with the behavioral profiles for the participants, the prompt associated with the non-verbal cue is customized based on the determined expectations of non-verbal cues and the behavioral profiles.

Example 16

The method of any of Examples 1-15, further comprising: detecting termination of the video communication session; and displaying, at a client device of at least one participant, one or more metrics relating to at least one of: determined participant engagement, detected non-verbal cues, identified geographical locations of participants, and determined cultural expectations of participants regarding non-verbal cues during the video communication session.

Example 17

The method of any of Examples 1-16, further comprising: detecting termination of the video communication session; and providing, at a client device of at least one participant, playback access to one or more recorded highlights of the video communication session, the highlights are determined based on detected non-verbal cues associated with participant engagement.

Example 18

A non-transitory computer-readable medium containing instructions, comprising: instructions for displaying, for each of a number of participants within a video communication session, a UI comprising: a number of participant windows corresponding to the number of participants, and a video for each of at least a subset of the participants, wherein the video is displayed within the corresponding participant window for the participant; instructions for analyzing, in real time, each video to detect a non-verbal cue from a participant; instructions for determining that the non-verbal cue has been sustained for a duration that exceeds a designated threshold of time; and instructions for displaying, within the UI of at least one of the participants, a prompt associated with the non-verbal cue.

Example 19

The non-transitory computer-readable medium of Example 18, wherein analyzing each video to detect the non-verbal cue from the participant comprises: identifying a section of each video corresponding to the eyes of the participant; and analyzing, in real time, each video to detect sustained eye contact from a participant on a subject.

Example 20

The non-transitory computer-readable medium of any of Examples 18-19, wherein the prompt associated with the non-verbal cue is displayed to the participant in the video associated with the non-verbal cue.

Example 21

The non-transitory computer-readable medium of any of Examples 18-20, wherein the prompt displayed to the participant comprises one or more of: a recommendation to verbally engage with one or more participants within the video communication session, and a recommendation to engage with one or more UI components indicating an intent to verbally engage.

Example 22

The non-transitory computer-readable medium of any of Examples 18-21, wherein the prompt associated with the non-verbal cue is displayed to one or more of: a host participant of the video communication session, and a currently speaking participant of the video communication session.

Example 23

The non-transitory computer-readable medium of any of Examples 18-22, further comprising: for each participant for which the prompt is displayed: instructions for identifying a geographical location associated with that participant, and instructions for determining one or more cultural expectations of non-verbal cues based on the geographical location for the participant, the prompt displayed for the participant is customized based on the one or more determined cultural expectations.

Example 24

The non-transitory computer-readable medium of any of Examples 18-23, wherein the prompt displayed to the at least one participant comprises a notification that the participant in the video associated with the non-verbal cue intends to verbally engage.

Example 25

The non-transitory computer-readable medium of any of Examples 18-24, wherein the prompt displayed to the at least one participant comprises a recommendation for the at least one participant to prompt the participant associated with the non-verbal cue for verbal input within the video communication session.

Example 26

The non-transitory computer-readable medium of any of Examples 18-25, further comprising: instructions for identifying a geographical location of the participant associated with the non-verbal cue, the detecting of the non-verbal cue comprises identifying a non-verbal cue from a list of non-verbal cues associated with the geographical location.

Example 27

The non-transitory computer-readable medium of any of Examples 18-26, wherein the designated threshold of time is modified based on the geographical location of the participant associated with the non-verbal cue.

Example 28

The non-transitory computer-readable medium of any of Examples 18-27, wherein one or more aspects of detecting non-verbal cue on a subject within the video for one of the participants is performed by an AI algorithm.

Example 29

The non-transitory computer-readable medium of Example 28, wherein the AI algorithm is trained on a plurality of prior video communication sessions.

Example 30

The non-transitory computer-readable medium of any of Examples 18-29, further comprising: instructions for modifying a preexisting arrangement of the participant windows within the UI to place the participant associated with the non-verbal cue in a more prominent or higher position.

Example 31

The non-transitory computer-readable medium of any of Examples 18-30, further comprising: instructions for receiving a behavioral profile for the participant associated with the non-verbal cue; and instructions for determining one or more non-verbal cues associated with the behavioral profile for the participant, the prompt associated with the non-verbal cue is customized based on the determined non-verbal cues and behavioral profile.

Example 32

The non-transitory computer-readable medium of any of Examples 18-31, further comprising: instructions for receiving behavioral profiles for one or more of: a host participant, and a currently speaking participant; instructions for determining one or more expectations of non-verbal cues associated with the behavioral profiles for the participants, the prompt associated with the non-verbal cue is customized based on the determined expectations of non-verbal cues and the behavioral profiles.

Example 33

The non-transitory computer-readable medium of any of Examples 18-32, further comprising: instructions for detecting termination of the video communication session; and displaying, at a client device of at least one participant, one or more metrics relating to at least one of: determined participant engagement, detected non-verbal cues, identified geographical locations of participants, and determined cultural expectations of participants regarding non-verbal cues during the video communication session.

Example 34

The non-transitory computer-readable medium of any of Examples 18-19, further comprising: instructions for detecting termination of the video communication session; and instructions for providing, at a client device of at least one participant, playback access to one or more recorded highlights of the video communication session, the highlights are determined based on detected non-verbal cues associated with participant engagement.

Example 35

A system comprising one or more processors configured to perform the operations of: displaying, for each of a number of participants within a video communication session, a UI comprising: a number of participant windows corresponding to the number of participants, and a video for each of at least a subset of the participants, wherein the video is displayed within the corresponding participant window for the participant; analyzing, in real time, each video to detect a non-verbal cue from a participant; determining that the non-verbal cue has been sustained for a duration that exceeds a designated threshold of time; and displaying, within the UI of at least one of the participants, a prompt associated with the non-verbal cue.

Example 36

The system of Example 35, wherein analyzing each video to detect the non-verbal cue from the participant comprises: identifying a section of each video corresponding to the eyes of the participant; and analyzing, in real time, each video to detect sustained eye contact from a participant on a subject.

Example 37

The system of any of Examples 35-36, wherein the prompt associated with the non-verbal cue is displayed to the participant in the video associated with the non-verbal cue.

Example 38

The system of any of Examples 35-37, wherein the prompt displayed to the participant comprises one or more of: a recommendation to verbally engage with one or more participants within the video communication session, and a recommendation to engage with one or more UI components indicating an intent to verbally engage.

Example 39

The system of any of Examples 35-38, wherein the prompt associated with the non-verbal cue is displayed to one or more of: a host participant of the video communication session, and a currently speaking participant of the video communication session.

Example 40

The system of any of Examples 35-39, further comprising: for each participant for which the prompt is displayed: identifying a geographical location associated with that participant, and determining one or more cultural expectations of non-verbal cues based on the geographical location for the participant, the prompt displayed for the participant is customized based on the one or more determined cultural expectations.

Example 41

The system of any of Examples 35-40, wherein the prompt displayed to the at least one participant comprises a notification that the participant in the video associated with the non-verbal cue intends to verbally engage.

Example 42

The system of any of Examples 35-41, wherein the prompt displayed to the at least one participant comprises a recommendation for the at least one participant to prompt the participant associated with the non-verbal cue for verbal input within the video communication session.

Example 43

The system of any of Examples 35-42, further comprising: identifying a geographical location of the participant associated with the non-verbal cue, the detecting of the non-verbal cue comprises identifying a non-verbal cue from a list of non-verbal cues associated with the geographical location.

Example 44

The system of any of Examples 35-43, wherein the designated threshold of time is modified based on the geographical location of the participant associated with the non-verbal cue.

Example 45

The system of any of Examples 35-44, wherein one or more aspects of detecting non-verbal cue on a subject within the video for one of the participants is performed by an AI algorithm.

Example 46

The system of Example 45, wherein the AI algorithm is trained on a plurality of prior video communication sessions.

Example 47

The system of any of Examples 35-46, further comprising: modifying a preexisting arrangement of the participant windows within the UI to place the participant associated with the non-verbal cue in a more prominent or higher position.

Example 48

The system of any of Examples 35-47, further comprising: receiving a behavioral profile for the participant associated with the non-verbal cue; and determining one or more non-verbal cues associated with the behavioral profile for the participant, the prompt associated with the non-verbal cue is customized based on the determined non-verbal cues and behavioral profile.

Example 49

The system of any of Examples 35-48, further comprising: receiving behavioral profiles for one or more of: a host participant, and a currently speaking participant; determining one or more expectations of non-verbal cues associated with the behavioral profiles for the participants, the prompt associated with the non-verbal cue is customized based on the determined expectations of non-verbal cues and the behavioral profiles.

Example 50

The system of any of Examples 35-49, further comprising: detecting termination of the video communication session; and displaying, at a client device of at least one participant, one or more metrics relating to at least one of: determined participant engagement, detected non-verbal cues, identified geographical locations of participants, and determined cultural expectations of participants regarding non-verbal cues during the video communication session.

Example 51

The system of any of Examples 35-50, further comprising: detecting termination of the video communication session; and providing, at a client device of at least one participant, playback access to one or more recorded highlights of the video communication session, the highlights are determined based on detected non-verbal cues associated with participant engagement.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
analyzing, in real time, each video feed from a plurality of participants within a video communication session to detect a non-verbal cue from a first participant of the plurality of participants;
determining that the non-verbal cue has been sustained for a duration that exceeds a designated threshold of time;
customizing a prompt corresponding to the non-verbal cue, wherein the prompt identifies the non-verbal cue and provides specific information of cultural expectations of the non-verbal cues according to a geographical location of the first participant; and
displaying the prompt within a user interface (UI) of a second participant of the plurality of participants.

2. The method of claim 1, wherein analyzing each video feed to detect the non-verbal cue from the first participant comprises:
identifying a section of each video feed corresponding to eyes of the first participant; and
analyzing, in real time, each video feed to detect sustained eye contact from the first participant on a subject.

3. The method of claim 1, wherein the prompt is displayed to the second participant in the video feed associated with the non-verbal cue.

4. The method of claim 3, wherein the prompt comprises one or more of: a recommendation to verbally engage with one or more participants within the video communication session, and a recommendation to engage with one or more UI components indicating an intent to verbally engage.

5. The method of claim 1, wherein the prompt is displayed to one or more of: a host participant of the video communication session, and a currently speaking participant of the video communication session.

6. The method of claim 1, wherein the prompt comprises a notification that the first participant associated with the non-verbal cue intends to verbally engage.

7. The method of claim 1, wherein the prompt comprises a recommendation for the second participant to prompt the first participant for verbal input within the video communication session.

8. The method of claim 1, wherein detecting the non-verbal cue comprises identifying the non-verbal cue from a list of non-verbal cues associated with the geographical location, and wherein the designated threshold of time is modified based on the geographical location of the first participant.

9. The method of claim 1, wherein non-verbal cues are detected by an artificial intelligence (AI) algorithm, wherein the AI algorithm is trained on a plurality of prior video communication sessions.

10. The method of claim 1, further comprising:
modifying a preexisting arrangement of participant windows within the UI to place the first participant in a more prominent or higher position.

11. The method of claim 1, further comprising:
receiving a profile for the first participant; and
determining one or more non-verbal cues associated with the profile for the first participant, wherein the prompt associated with the non-verbal cue is customized based on the profile.

12. The method of claim 1, further comprising:
receiving profiles for one or more of a host participant and a currently speaking participant; and
determining one or more expectations of non-verbal cues associated with the profiles for the plurality of participants, wherein the prompt associated with the non-verbal cue is customized based on the determined expectations of non-verbal cues and profiles.

13. The method of claim 1, further comprising:
detecting termination of the video communication session; and
displaying, at a client device of at least one participant, one or more metrics relating to at least one of: determined participant engagement, detected non-verbal cues, identified geographical locations of participants, and determined cultural expectations of participants regarding non-verbal cues during the video communication session.

14. The method of claim 1, further comprising:
detecting termination of the video communication session; and
providing, at a client device of at least one participant of the plurality of participants, playback access to one or more recorded highlights of the video communication session, wherein the highlights are determined based on detected non-verbal cues associated with participant engagement.

15. A non-transitory computer-readable medium containing instructions, comprising:
instructions for analyzing, in real time, each video feed from a plurality of participants within a video communication session to detect a non-verbal cue from a first participant of the plurality of participants;
instructions for determining that the non-verbal cue has been sustained for a duration that exceeds a designated threshold of time;
instructions for customizing a prompt corresponding to the non-verbal cue, wherein the prompt identifies the non-verbal cue and provides specific information of one or more cultural expectations of the non-verbal cue according to a geographical location of the first participant; and
instructions for displaying the prompt within a user interface (UI) of a second participant of the plurality of participants.

16. The non-transitory computer-readable medium of claim 15, wherein the instructions for analyzing each video feed to detect the non-verbal cue from the first participant comprises:
instructions for identifying a section of each video feed corresponding to eyes of the first participant; and
instructions for analyzing, in real time, each video feed to detect sustained eye contact from the first participant on a subject.

17. A system comprising one or more processors configured to perform operations of:
analyzing, in real time, each video feed from a plurality of participants within a video communication session to detect a non-verbal cue from a first participant of the plurality of participants;
determining that the non-verbal cue has been sustained for a duration that exceeds a designated threshold of time;
customizing a prompt corresponding to the non-verbal cue, wherein the prompt identifies the non-verbal cue and provides specific information of one or more cultural expectations of the non-verbal cue according to a geographical location of the first participant; and
displaying the prompt within a user interface (UI) of a second participant of the plurality of participants.

18. The system of claim 17, wherein the prompt associated with the non-verbal cue is displayed to the second participant in the video feed associated with the non-verbal cue.

19. The system of claim 18, wherein the prompt displayed to the second participant comprises one or more of: a recommendation to verbally engage with one or more participants within the video communication session, and a recommendation to engage with one or more UI components indicating an intent to verbally engage.

* * * * *